Dec. 16, 1952    J. M. TIEDTKE    2,621,461
CANE LOADING AND CHOPPING MACHINE
Filed Sept. 29, 1948    2 SHEETS—SHEET 1
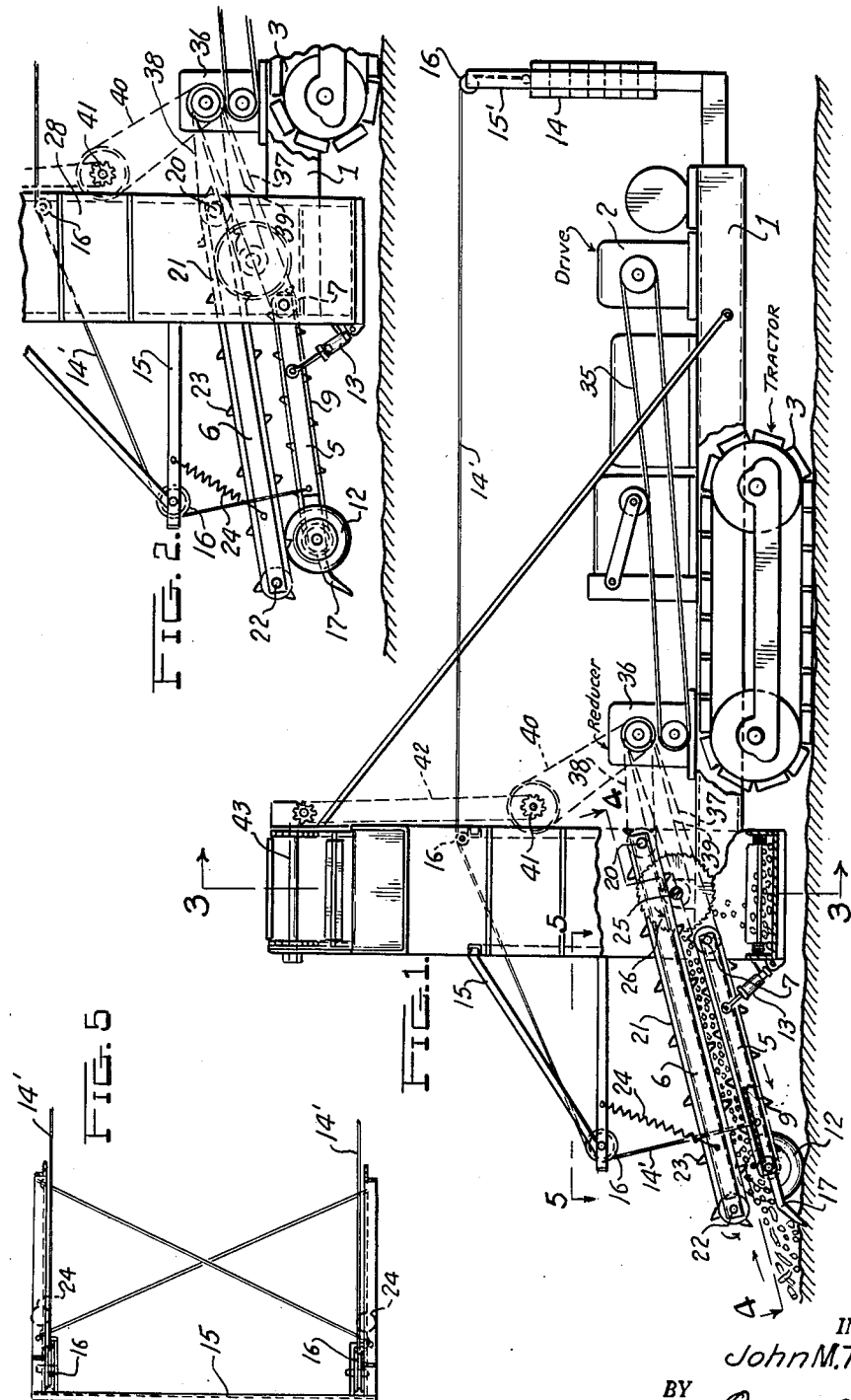
INVENTOR.
John M. Tiedtke
BY
Owen & Owen,
ATTORNEYS Dec. 16, 1952     J. M. TIEDTKE     2,621,461
CANE LOADING AND CHOPPING MACHINE
Filed Sept. 29, 1948     2 SHEETS—SHEET 2
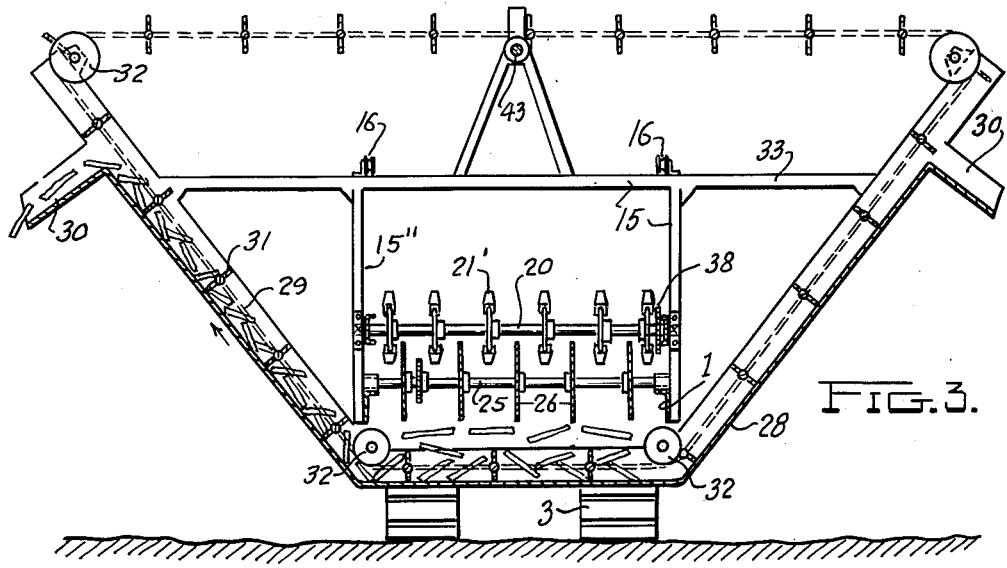
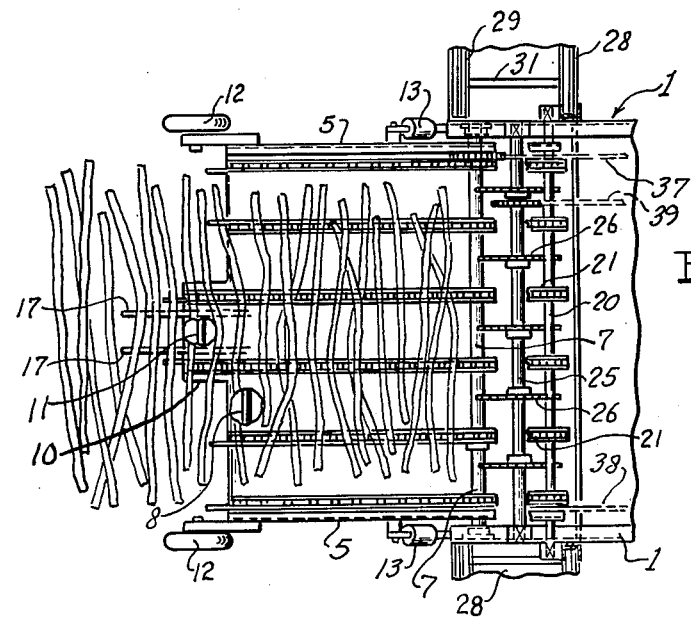
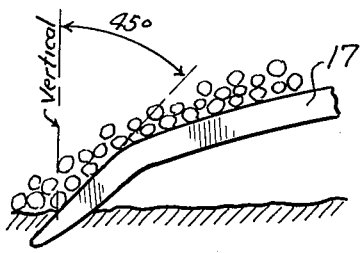
INVENTOR.
John M. Tiedtke
BY
ATTORNEYS Patented Dec. 16, 1952

2,621,461

UNITED STATES PATENT OFFICE 2,621,461

CANE LOADING AND CHOPPING MACHINE

John M. Tiedtke, Clewiston, Fla.

Application September 29, 1948, Serial No. 51,713

1 Claim. (Cl. 55—118)

This invention relates to a machine for picking up and delivering sugar cane from a cut irregular reclining position on the ground to saws where it is severed into short sections and then delivered to carrying-away trucks or field wagons for conveying to points of storage or use.

Considerable difficulty is encountered in the harvesting of sugar cane due to the fact that the cane grows tall and the stalks are frequently badly bent and distorted. The can is cut and laid between the rows and the long and distorted stalks may be cut into several sections to facilitate handling. The cut cane is usually disposed on the ground in a ragged or irregular manner, due both to the carelessness of the workers and to the bent condition of the stalks, and this makes it extremely difficult to pick up and deliver the cane to carrying-away wagons. The present system of loading with a grab makes very light loads in the wagons because the curved stalks will not pack. Another difficulty in the use of the present system of loading is that the grab will not only pick up the loose cane but will also carry dirt and cane stubble up to the wagons.

An object of the invention is the provision of a machine which will economically and efficiently pick up and deliver cut cane to saws for cutting into short sections and then to deliver such sections to wagons without regard to the irregular piling or the curved or bent condition of the stalks.

Another object of the invention is to eliminate the use of grabs in connection with machines of this character and to accomplish the picking up and delivery of cut cane to the carrying-away wagons in a condition which will permit it to pack more firmly in the wagons and will prevent the carrying up of dirt and stubble therewith.

Other objects and advantages of the invention will be apparent from the following detailed description and from the accompanying drawings illustrating one embodiment of the invention, in which—

Fig. 1 is a side elevation of a machine embodying the invention, with parts broken away and with the cane picking-up conveyors in lowered operative position; Fig. 2 is a similar fragmentary view with the pick-up conveyors in raised inoperative position; Fig. 3 is a section on the line 3—3 in Fig. 1, with parts in full; Fig. 4 is a section on the line 4—4 in Fig. 1, with parts in full and with parts broken away; Fig. 5 is a fragmentary top plan view of a part of the frame structure with associated conveyor elevating means, and Fig. 6 is an enlarged fragmentary detail of the cane picking-up fingers of the pick-up conveyors.

Referring to the drawings, 1 designates the machine frame supported by tractor means 3, preferably of the endless chain tread type. A motor 2 on the frame is in driving connection with the tractor means.

Two cane pick-up conveyor frames 5 and 6 project forward from the frame 1, one above the other, and are independently pivoted at their rear ends to the machine frame for relative vertical pivotal movements. The lower frame 5 is pivoted on a shaft 7 journaled in the front end of the frame 1, and this shaft is connected to a front shaft 8 on the conveyor frame through a plurality of conveyor chains 9 extending lengthwise of the frame and passing around sprocket wheels on the respective shafts. In the present instance, the conveyor frame 5 is provided at its front or free end with a centrally disposed extension 10, and two of said chains pass around sprocket wheels on a shaft 11 in this extension (Fig. 4). The front end of the frame 5 is provided at each side with a depth gauge wheel 12 for traveling on the ground when the frame is in lowered cane picking-up position.

A hydraulic jack means conventionally shown at 13 connects the rear end portion of the conveyor frame 5 at each side to the front end of the main frame 1 and is operable, as well understood in the art, to raise the conveyor frame and to permit a gravity lowering thereof. The weight of the conveyor frame 5 may be counterbalanced, to some extent at least, by weights 14 connected to the frame by cables 14' extending over guide sheaves on a front frame structure 15 and a rear frame structure 15' each rising from the respective end of the main frame 1. The guide sheaves are designated 16.

Projecting forwardly from the front or free end of the conveyor frame 5, and particularly in the present instance from the extension 10, are a plurality of forwardly and downwardly extending main pick-up fingers 17. The free ends of these fingers penetrate the surface portion of the soil over which they pass during a forward movement of the machine and cause the cane stalks with which they come in contact to pass up the fingers and over the forward ends of the conveyor chains 9, which latter are provided at intervals with customary outwardly projecting fingers or lugs which engage and continue the even feeding of the stalks up the conveyor and over its rear end. It is found in practice that the best feeding results of the cane stalks up fingers 17 are obtained by extending the fingers 17 forwardly and downwardly at a slight incline from the forward end of the conveyor 5 and then to shape the fingers so that they dip down quite rapidly at their forward ends at substantially a 45° angle to a vertical, as shown in Fig. 6. The end portions of the fingers, which are at this angle, commence two or three inches above the soil and are of sufficient length to extend substantially the same distance into the soil. With fingers of this form, it is found that practically no piling up and clogging of the stalks on the fingers and at the forward end of the conveyor is present and that the dirt will not be carried up with the cane.

The upper conveyor frame 6 is pivoted at its rear end for vertical swinging movements on a cross-shaft 20 mounted in a raised portion of the frame 1 and located rearwardly of and a distance above the level of the shaft 7 on which the lower frame 5 is mounted. In the present instance, the shaft 20 is located near the rear of the upright portion 15'' of the frame 15 above the main frame part 1, while the shaft 7 is journaled in the forward portion of said upright frame and at a lower level than the shaft 20. A series of conveyor chains 21 connect and pass around sprockets or guiding wheels 21' on the shaft 20 and on a shaft 22 at the forward end of the frame 6. These chains are provided at intervals with fingers 23 for cooperating with like fingers on the lower conveyor chains 9 to engage and feed the cane stalks rearwardly between the two conveyors after passing up the pick-up fingers 17. The conveyor chains are driven in opposite directions so that the top flight portion of the lower chains and the bottom flight portion of the upper chains have a rearward feeding movement, as well understood in the art. The forward end of the top conveyor frame 6 extends beyond the forward end of the bottom frame 5 and over the pick-up fingers 17, so that the conveyor chains at such end will engage and assist the feeding movement of the cane stalks over the fingers and into position to be engaged by the lower set of conveyor chains. The conveyor frame 6 is substantially parallel with the frame 5 when in operation, but is free to move upward and downward relative to the frame 5 to accommodate the varying thicknesses of stalk material passing between the two conveyors. The weight of the conveyor 6 is counterbalanced by a contractile spring 24 to permit it to freely raise and lower with the frame 5. This spring connects the conveyor frame 6 to superposed portions of the frame structure 15.

Journaled on the rear portion of the main frame 1 between the shafts 7 and 20, parallel therewith, is a shaft 25 on which a series of rotary saw blades 26 are mounted in predetermined spaced relation and in position to sever the cane stalks into short sections as they are delivered from the rear end of the lower set of conveyor chains 9. The severed cane stalk sections fall into the bottom or loop portion of a U-shaped side conveyor trough 28 and are delivered therefrom in one direction or the other laterally of the machine by the conveying action of an endless conveyor chain 29. The trough 28 extends crosswise of the front portion of the machine frame 1 and upward on an incline laterally from each side of the machine and terminates at each side in a side delivery chute 30 by which the raised cane sections are delivered to a carry-away truck. The conveyor chain passes around guide wheels 32 located at desired turning points on the trough. The opposite end portions of the trough 28 are tied together by a cross-piece 33 on the frame structure 15.

The drive for the various conveyor members and the saw shaft 25 is conventionally illustrated as being from the motor 2 through a drive belt 35 to a speed change means 36 and thence through a chain and sprocket connection 37 to the shaft 7 for the lower conveyors 9, through a similar connection 38 to the shaft 20 for the upper conveyors 21 and through a belt and pulley connection 39 with the saw shaft 25. The driving connections for the conveyors 9 and 21 are geared to drive these conveyors in reverse directions at the same speed and at approximately the speed of travel of the machine, while the connection for the saw shaft is geared to drive such shaft at a much faster speed. Power is also taken off from the variable drive means 36 for driving the delivery conveyor means 29. In the present instance, this take-off is through a belt 40 to a shaft 41 on the frame structure 15 and thence through a suitable connection 42 to a shaft 43 carrying drive sprocket wheels in connection with the conveyor chain 29.

In the use of the machine, it is driven forward with the conveyor frames 5 and 6 lowered into cane picking-up position, as shown in Fig. 1, and with the pick-up fingers 17 projecting a short distance into the soil. As the fingers 17 pass under the reclining cane stalks, which are usually disposed in uneven position on the ground between rows of cane that have been cut, the stalks are forced up the inclines of the fingers into position to be engaged by the forward end of the upper conveyor chains 21 which assist the rearward movement of the stalks between the upper and lower sets of conveyors. These conveyors are geared to travel at approximately the speed of travel of the machine so that the cane stalks will be carried away from the front end of the conveyor as fast as they are brought into conveyor engaging position, thus preventing any piling up of the stalks at the mouth of the conveyor and a consequent choking of the conveyor feed. The upper conveyor is free to move up and down to suit the vertical thickness of the cane material passing thereunder, thus facilitating a substantially even feed of the cane material to the saws 26. As the cane stalks are delivered from the rear end of the lower conveyor, they are engaged and cut into short sections by the saws 26 and these sections then drop into the bottom of the delivery trough 28 and are delivered in one direction or the other therefrom by the delivery conveyor 29, depending on its direction of travel which is controlled by conventional means not shown.

I wish it understood that my invention is not limited to any specific construction, arrangement or form of the parts, as it is capable of numerous modifications and changes without departing from the spirit of the claim.

Having thus described my invention, what I claim as new, and desire to secure by United States Letters Patent, is:

In a cane-loading machine, a wheeled frame, upper and lower conveyor frames disposed in adjacent relation one above the other and pivoted at their rear ends to said first frame for independent raising and lowering movements, the pivot of the upper conveyor frame being disposed rearwardly and above the level of the other, cane severing saws between said pivots, endless conveyor means operating around said conveyor frames and having adjacent runs between said frames moving rearwardly and cooperating to move material rearward therebetween, means for driving said conveyor means at the same speed and at the speed of movement of the wheeled frame to deliver picked-up cane to said saws, a wheel support for the front end of the lower conveyor frame, and means for supporting the front end of the upper conveyor frame to permit it to yieldingly rest on the cane passing between the two frames.

JOHN M. TIEDTKE.

REFERENCES CITED

The following references are of record in the file of this patent:

UNITED STATES PATENTS

| Number | Name | Date |
|---|---|---|
| 1,200,937 | Hannaford et al. | Oct. 10, 1916 |
| 1,505,476 | London | Aug. 19, 1924 |
| 1,559,429 | Hirai | Oct. 27, 1925 |
| 1,771,025 | Barry | July 22, 1930 |
| 2,435,910 | Trinkle et al. | Feb. 10, 1948 |